United States Patent [19]
Wittmaier

[11] Patent Number: 5,840,154
[45] Date of Patent: Nov. 24, 1998

[54] METHOD AND DEVICE FOR JOINING A SEALING FOIL WITH A WEB OF MATERIAL

[75] Inventor: Klaus Wittmaier, Vaihingen/Enz, Germany

[73] Assignee: Schober GmbH Werkzeug- und Maschinenbau, Eberdingen/Hochdorf, Germany

[21] Appl. No.: 623,554

[22] Filed: Mar. 28, 1996

[30] Foreign Application Priority Data

Mar. 30, 1995 [DE] Germany ............... 195 11 698.4

[51] Int. Cl.⁶ .................................................. B29C 65/08
[52] U.S. Cl. ................. 156/580.2; 156/498; 156/580.1; 425/174.2
[58] Field of Search ...................... 156/73.1, 498, 156/580.1, 580.2, 583.1; 264/442, 443, 444; 425/174.2

[56] References Cited

U.S. PATENT DOCUMENTS

| | | | |
|---|---|---|---|
| 3,836,413 | 9/1974 | Frohlich et al. | 156/73.1 |
| 4,080,241 | 3/1978 | Grevich et al. | 156/498 |
| 4,088,519 | 5/1978 | Johnson | 156/73.1 |
| 4,400,227 | 8/1983 | Riemersma | 156/73.1 |
| 4,404,052 | 9/1983 | Persson et al. | 156/73.1 |
| 4,531,999 | 7/1985 | Persson et al. | 156/580.2 |
| 5,230,761 | 7/1993 | Crawford | 156/73.3 |
| 5,242,529 | 9/1993 | Riedel | 156/580.1 |
| 5,244,532 | 9/1993 | Wadium et al. | 156/580.1 |
| 5,545,275 | 8/1996 | Herrin et al. | 156/73.1 |

FOREIGN PATENT DOCUMENTS

| | | |
|---|---|---|
| 0 007 558 | 2/1980 | European Pat. Off. . |
| 3210551C2 | 11/1984 | Germany . |
| 4105013A1 | 8/1992 | Germany . |
| 3734855C2 | 12/1992 | Germany . |

Primary Examiner—James Sells
Attorney, Agent, or Firm—Jones, Tullar & Cooper, P.C.

[57] ABSTRACT

A method and a device for joining a sealing foil to a web of material, the sealing foil is brought to the web of material, and the web of material, together with the sealing foil, is moved along the surface of a support body. The sealing foil is connected in a simple manner with the web of material in that the web of material, along with the sealing foil, is passed between an ultrasonic unit and the surface of the support body, and that ultrasonic energy is introduced into the web of material and/or the sealing foil by means of the ultrasonic unit for connecting the sealing foil with the web of material.

16 Claims, 2 Drawing Sheets

METHOD AND DEVICE FOR JOINING A SEALING FOIL WITH A WEB OF MATERIAL

BACKGROUND OF THE INVENTION

The present invention relates to method for joining a sealing foil to a web of material, wherein the sealing foil is brought to the web of material and the web of material, together with the sealing foil, is moved along the surface of a support body. The invention furthermore relates to a device for joining a sealing foil to a web of material, having a support body on whose surface the web of material rests together with the sealing foil.

A method and a device for applying an embossing foil print on a flexible web of material is known from DE 32 10 551 C2. In this device the web of material together with the embossing foil are guided around a heated sealing cylinder and are pressed against the surface of the sealing cylinder by means of pivotable pressure rollers. A large loop is achieved and the web of material, together with the embossing foil, is pressed against many places on the surface of the sealing cylinder, used as the support body.

It has been shown to be disadvantageous in connection with this device, that a relatively complicated support system is required for the pressure rollers, because it is necessary to lift the roller from the surface of the heated sealing cylinder for threading in a fresh web of material, and it must subsequently, i.e. after the insertion of the web of material, again be moved onto the surface of the sealing cylinder. It is furthermore necessary to apply the same and constant pressure to the rollers. It is furthermore considered to be disadvantageous that because of the heated sealing cylinder the entire web of material is heated, and that the web of material shrinks, both in the linear and the transverse direction, because of the large loop angle. In addition, it is not possible to process every material or only those of limited thermal sensitivity with a device of this type. Following the passage through the sealing section over the sealing cylinder, it is absolutely necessary to cool the web of material, which entails a large structural and requires a large financial outlay. It is furthermore necessary for the web of material to be flexible, so that it can be guided around the heated roller over a relatively large loop angle. In addition, guiding it around the heated roller over a relatively large loop angle has the additional disadvantage that warping inside the individual layers of a multi-layered material can occur or that, after embossing the curved web of material, the sealing foil is twisted when the web of material is aligned, which can result in damage to the embossing foil.

SUMMARY OF THE INVENTION

An object of the present invention is therefore based on the further development of a method and a device of the type previously mentioned according to which a sealing foil can be joined to a web of material by relatively simple means.

In accordance with the present invention, this object is attained by means of a method and a device wherein the web of material with the sealing foil is passed between an ultrasonic unit and the surface of a support body, and that ultrasonic energy is introduced into the web of material and/or the sealing foil for connecting the sealing foil with the web of material by means of ultrasound.

The method in accordance with the present invention has the essential advantage that the introduction of energy for joining the sealing foil with the web of material does not take place through the support body, so that it can have any desired temperature. The introduction by means of an ultrasonic unit can be emitted in a considerably more directed manner, and chronological and local changes in the energy introduction, for example a pulsating energy introduction or the like, is easily possible. The savings in operating cost are considered to be a further advantage, since no rollers need to be heated and no cooling devices are required. In addition, the web of material is treated in a thermally gentle manner and warping is thereby prevented.

In a preferred exemplary embodiment, the surface of the support body is moved along with the web of material. This has the advantage that the support body can be used as a feed drive for the web of material and the sealing foil, so that no frictional forces, which might possibly damage the web of material, can occur between the web of material and the support body.

With other embodiments the web of material is moved relative to the surface of the support body. This embodiment has the essential advantage that it has no moving parts and is therefore constructed relatively simply and can therefore also be employed as a cost-efficient retrofit component.

In connection with a further embodiment it is provided that during joining of the sealing foil the web of material is moved on a straight or curved track. The movement of the web of material along a straight surface has the advantage that multi-layer material can be processed without fear of warping or damage to individual layers. It is also possible to process webs of material which are relatively inflexible and can therefore not be moved over a roller. The movement of the web of material together with the sealing foil over a curved track has the advantage that the sealing foil can be placed optimally, i.e. already under prestress, by means of appropriate tensioning rollers, and the ultrasonic unit is used solely for the introduction of energy and not for pressing the sealing foil on the web of material.

With the device mentioned at the outset, the above mentioned object is attained in accordance with the present invention in. an ultrasonic unit is provided and that the ultrasonic unit and the surface of the support body form a sealing gap for the web of material with the sealing foil.

Thus, with this device in accordance with the present invention the web of material is moved together with the sealing foil through a sealing gap which can be relatively short in the direction of passage, since the introduction of energy is performed by means of the ultrasonic unit and not via the support body. For example, the amount of introduced energy can be a function of the speed of passage of the web of material. It is possible to change the energy introduction by a directed control of the ultrasonic unit, for example proportionally with the speed of passage of the web of material. Since the introduction of energy does not take place by heat conduction, the ultrasonic unit reacts directly, i.e. without delays because of inertia, to a change in the control of the ultrasonic unit.

With a further development it is provided that the sonotrode tip of the ultrasonic unit is adapted to the shape of the surface of the support body. With a flat support body, the sonotrode tip is also flat and possibly embodied with an inlet and an outlet. With a curved surface shape of the support body, for example, if it is a roller, the sonotrode tip is embodied correspondingly concave, so that it rests flat on the web of material or the sealing foil.

With special embodiments the support body, in particular a roller, can be heated. This supply of heat via the support body can affect the sealing process in a positive manner. However, with other embodiments this support body can be cooled, so that the heat created by the introduction of energy by the ultrasonic unit is dissipated to the support body immediately following the sealing process. However, a cooling section can also be placed downstream of the sealing section.

In a preferred embodiment of the present invention, the orthogonal dimension of the sonotrode tip of the ultrasonic unit in the direction of running of the web of material is embodied to be equal to or slightly greater than the corresponding dimension of the sealing foil. This, energy is emitted by the ultrasonic unit only in the area of the sealing foil. This has the advantage that it is also possible to use thermally sensitive webs of material, since the areas of the web of material located outside the sealing foil are not affected.

In a further device it is provided that the ultrasonic unit is connected with a device for keeping the height of the sealing gap constant. Possible temperature-dependent changes in the length of the sonotrodes are compensated for by means of this device.

It is possible to reduce the set-up times and adjustment times to a minimum by means of the device in accordance with the present invention, so that even relatively small batches can be processed in a cost-effective manner.

In connection with a further development it is provided that the support body on which the web of material rests has an ultrasound-absorbing surface. By means of this ultrasound-absorbing surface the ultrasonic vibrations, introduced by means of the sonotrode into the web of material and through the web of material into the surface of the support body, are prevented from being transmitted into the core of the support body. In this way the support body is not damaged by the ultrasound. This embodiment of the support body has been proven effective in particular in connection with very thin webs of material, since the total of the energy emitted by the sonotrode is not absorbed or cannot be absorbed by the web of material. The surface of the support body absorbs the ultrasonic energy and thus protects the core of the support body.

With a further embodiment it is provided that the surface is constituted by a separate element, for example a sleeve, which is connected in particular by means of an elastic element, for example plastic, caoutchouc, or the like, with the core of the support body. Because of the interposition of the elastic element between the surface and the core of the support element, ultrasonic vibrations cannot be transmitted further, but are absorbed in this particular elastic element. In a preferred manner this separate element is connected only in sections with the core of the support body. In particular, it does not rest with its entire surface on the core and instead is only supported at points or in a line shape or only in defined areas. Thus the transmission of the introduced ultrasound can only take place in these sectional areas, while the core of the support body is protected in the non-supported areas.

In accordance with a preferred exemplary embodiment, one or a plurality of hollow chambers are provided between the ultrasound-absorbent surface and the core of the support body, in this case the core of the support body can be provided with ribs, for example, or in the case of a rotating roller, with an outer thread. A sleeve can be pulled on this outer thread as the support surface for the web of material.

Further advantages, characteristics and details of the present invention ensue from the following description, in which particularly preferred exemplary embodiments are represented, making reference to the drawings.

DETAILED DESCRIPTION

Figure 1:
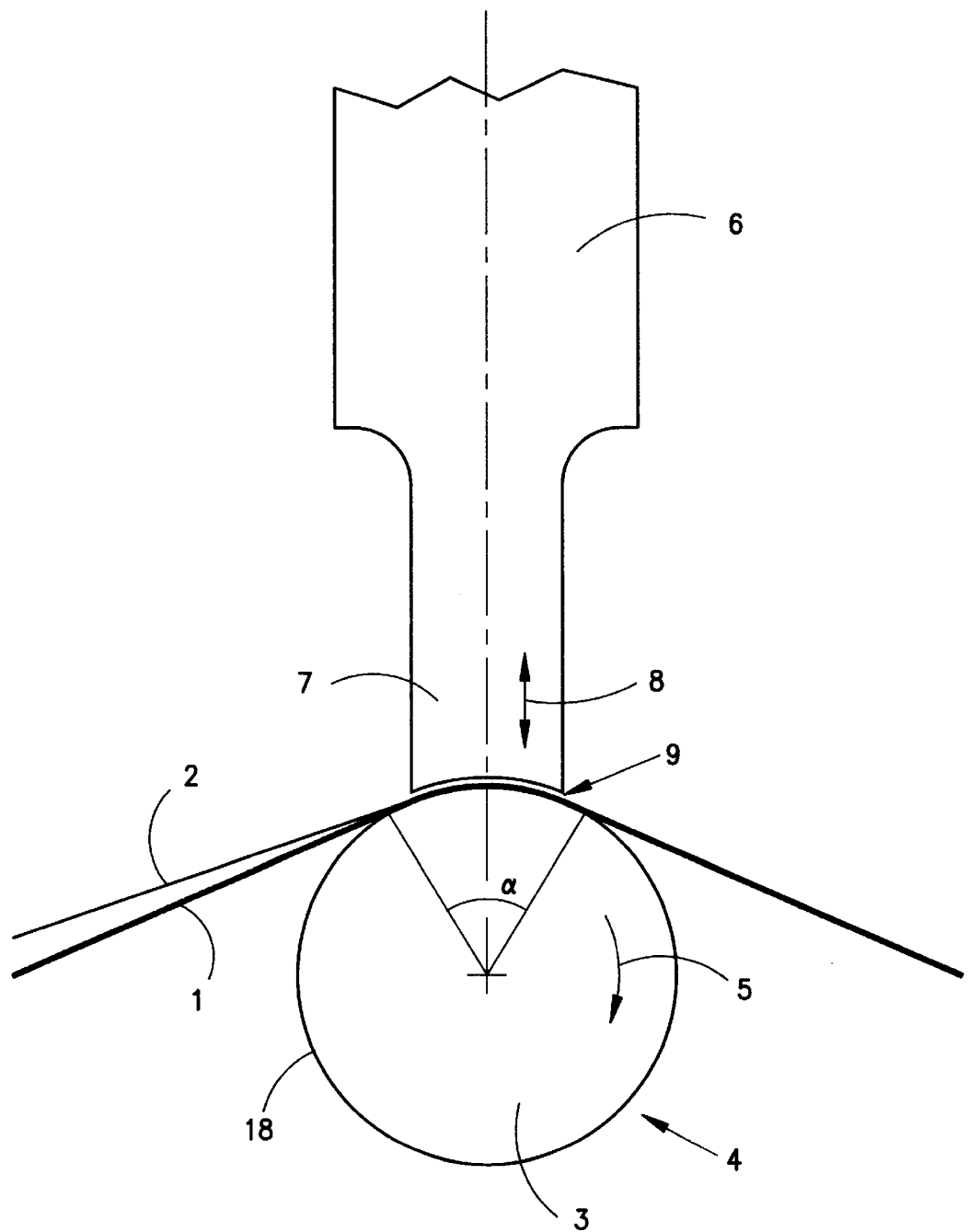
FIG. 1, shows a schematic lateral view of the structure of a preferred embodiment of the device in accordance with the present invention.

In the exemplary embodiment of a preferred sealing device represented in the drawings, a web of material 1 and a sealing foil 2 are brought together and guided over a rotatably mounted roller 3. The loop angle α is relatively shallow and lies at approximately 60°. Loop angles of less than 60°, for example 10°, are possible without problems. A flat surface can also be used as a support body 4 for the web of material 1 and the sealing foil 2 in place of a roller 3.

In the exemplary embodiment shown, the roller 3 rotates in the direction of the arrow 5. A sonotrode 6 of an ultrasonic unit, not shown, is located above the looped area of the roller 3. The tip 7 of the sonotrode 6 oscillates in the direction of the two-headed arrows 8. A sealing gap 9, which is of a defined height and through which the web of material 1 and the sealing foil 2 are passed, is located between the sonotrode tip 7 and the roller 3. In the exemplary embodiment shown, the sonotrode tip 7 rests on the sealing foil 2. However, it is also conceivable that the sonotrode tip 7 rests on the web of material 1, i.e. that the sealing foil 2 is located between the web of material 1 and the roller 3. The sonotrode tip 7 has a concave shape, which essentially corresponds to the radius of curvature of the roller 3. The dimension of the sonotrode 6 or its tip 7 which is orthogonal with respect to the drawing plane, essentially corresponds to the corresponding width of the sealing foil 2. In this way the introduction of energy by means of the sonotrode tip 7 is limited to the area of the sealing foil 2. A thermally sensitive coating of the web of material 1 would not be damaged or activated by the sonotrode 7. The roller 3 can be heated or unheated. A cooling device, not shown, can be provided downstream of the roller 3.

Figure 2:
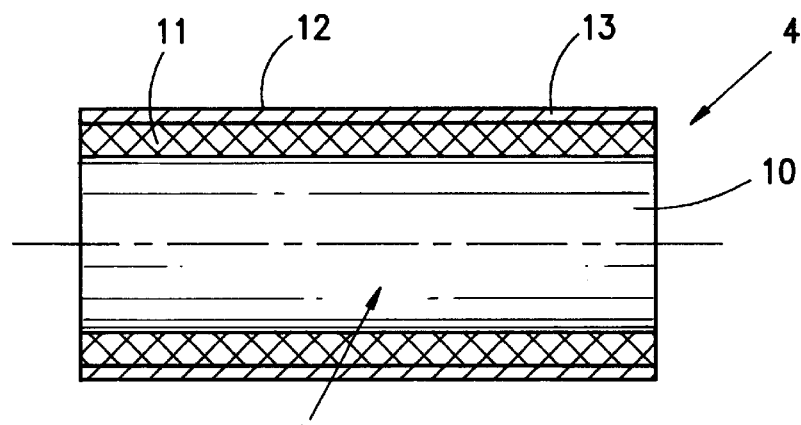
FIG. 2, shows a longitudinal sectional view through a first embodiment of the support body in accordance with the present invention, with an elastic element located between the surface and the core of the support body.

FIG. 2 represents a longitudinal section through a first exemplary embodiment of a support body 4, embodied as a rotating roller 3 and consisting of a core 10, a sleeve-shaped elastic element 11 enclosing the core 10, and a surface 12 surrounding the element. In this exemplary embodiment in FIG. 2, the surface 12 is constituted by a sleeve 13. If ultrasonic vibrations act on this sleeve 13, they are absorbed by the elastic element 11, which is made of caoutchouc, plastic, or the like, and are not transmitted to the core 10.

Figures 3, 4:
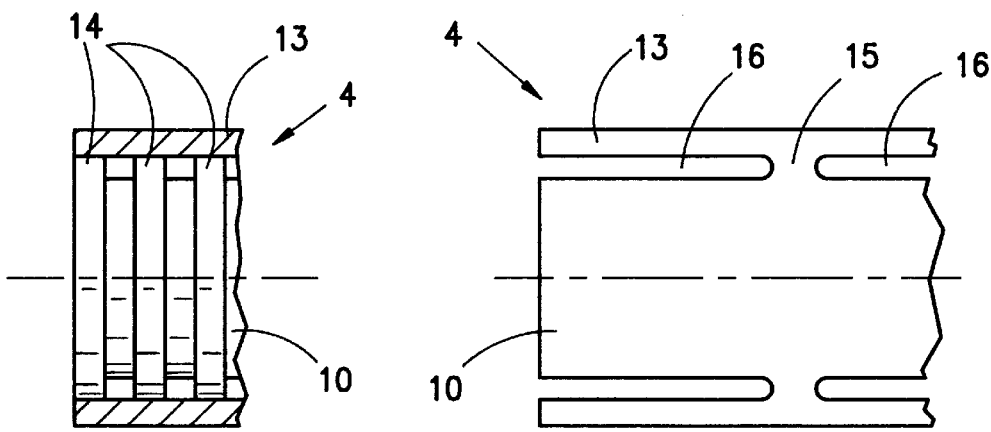
FIG. 3, shows a broken longitudinal sectional view through a second embodiment of the support body with circumferential ribs.
FIG. 4, show a broken longitudinal sectional view through a third embodiment of the support body with hollow chambers worked in below the surface.

A further exemplary embodiment of a support body 4 is represented in FIG. 3, wherein the core 10 has ribs 14 extending in the circumferential direction. A sleeve 13 is supported on the circumferential faces of these ribs 14, which therefore only rests on the core 10 with a part of its interior circumferential surface. An elastic seating of the sleeve is also achieved in this way.

In the exemplary embodiment of FIG. 4, the core 10 is made of one piece with a sleeve 13, wherein this sleeve 13 is connected with the core 10 via a radially extending strip 15. Hollow chambers 16 are located between the sleeve 13 and the core 10, which prevent the further transmission of the ultrasonic vibrations introduced into the sleeve 13.

Figure 5:
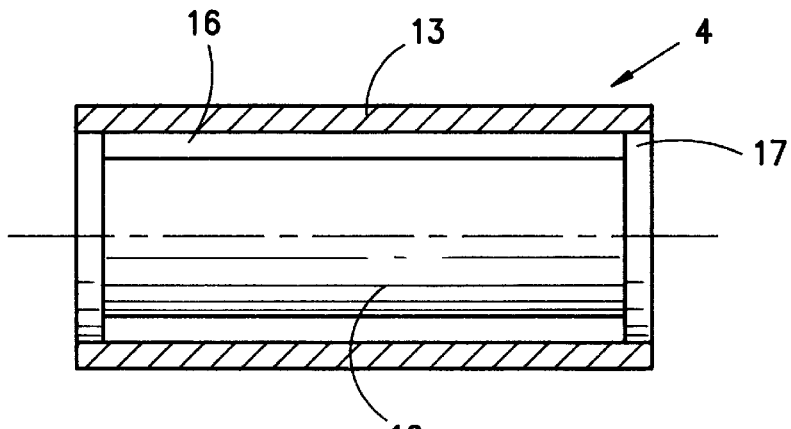
FIG. 5, show a fourth embodiment of the support body in accordance with the present invention with a sleeve drawn on the core of the support body.

In the exemplary embodiment of FIG. 5, the sleeve 13 is only supported in the area of its free ends on protrusions 17 which project past the core 10, so that it is at a distance from the core 10 in its central area. This hollow chamber 16 also prevents the further transmission of the ultrasonic vibrations, and these are introduced in particular in the medium portion of the support body 4 and thus in the area of the hollow chamber 16 into the sleeve 13.

The construction represented is illustrated purely schematically in the drawings, wherein the device can be embodied as an add-on unit or a retrofit set.

As shown in FIG. 1, the support body 4 can be provided with an intermediate layer 18 stretched on it, which is ultrasound-absorbent. However, the support body 4 can also be used without this intermediate layer 18. In another exemplary embodiment the intermediate layer 18 can be moved along with the web of material 1.

I claim:

1. A device for joining a sealing foil to a web of material, comprising:

a rotating cylindrical support body defining a cylindrical smooth surface; and an ultrasonic unit having a sonotrode tip, the shape of which is concave and matches the shape of said cylindrical surface such that the tip surface is smooth and defines an axis coaxial with the axis of said support body, wherein said support body and said ultrasonic unit define a sealing gap for passage of the sealing foil and web of material, and wherein the sealing foil and web of material are brought together in said sealing gap during their passage therethrough and rest against said surface, wherein the height defined by said sealing gap along the width and circumference of said sealing gap is constant.

2. The device as defined in claim 1, wherein said support body is a heated body.

3. The device as defined in claim 1, further comprising:

a cooling section, wherein said surface and said ultrasonic unit at said sealing gap define a sealing section, and wherein said cooling section is downstream of said sealing section.

4. The device as defined in claim 1, wherein the width of said sonotrode tip orthogonal to the direction of movement of said web of material and the width of said web of material in the same direction are equal.

5. The device as defined in claim 1, the width of said sonotrode tip orthogonal to the direction of movement of said web of material is slightly larger than the width of said web of material in the same direction.

6. The device as defined in claim 1, wherein said support surface includes an ultrasound absorbing surface.

7. The device as defined in claim 1, wherein said support body includes a core, a separate element and an elastic element which connects said separate element and said core.

8. The device as defined in claim 7, wherein said separate element comprises a sleeve.

9. The device as defined in claim 7, wherein said elastic element is plastic.

10. The device as defined in claim 9, wherein said elastic element is made of caoutchouc.

11. The device as defined in claim 7, wherein said separate element and said core are connected at sections.

12. The device as defined in claim 1, wherein said support surface includes an ultrasound absorbing surface, and wherein at least one hollow chamber is provided between said ultrasound absorbing surface and said core.

13. The device as defined in claim 12, wherein a plurality of hollow chambers are provided between said ultrasound absorbing surface and said core.

14. The device as defined in claim 7, wherein said core includes at least one outer rib.

15. The device as defined in claim 1, further comprising:

an ultrasound absorbing intermediate layer situated between the web of material and said surface, said intermediate layer moving along with the web of material.

16. The device as defined in claim 1, further comprising:

an ultrasound absorbing intermediate layer situated on said support body.

* * * * *